(No Model.)
J. D. SULLIVAN.
COMBINED CLEANER AND HEATER.
No. 389,720.      Patented Sept. 18, 1888.
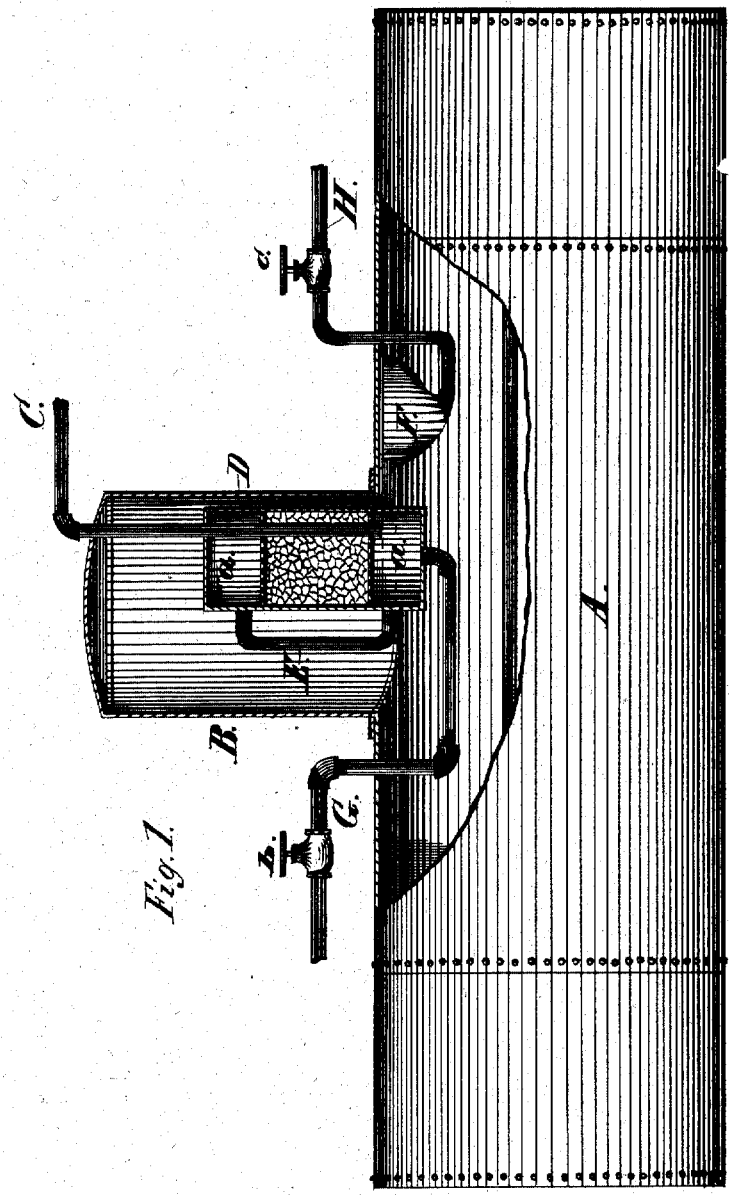
WITNESSES
Helmuth Holtz
Percy D. Parker
INVENTOR
John D. Sullivan
by W. R. Stringfellow
Attorney

UNITED STATES PATENT OFFICE.

JOHN D. SULLIVAN, OF NEW ORLEANS, LOUISIANA.

COMBINED CLEANER AND HEATER.

SPECIFICATION forming part of Letters Patent No. 389,720, dated September 18, 1888.

Application filed March 29, 1888. Serial No. 268,929. (No model.)

*To all whom it may concern:*

Be it known that I, JOHN D. SULLIVAN, a citizen of the United States, residing at New Orleans, in the parish of Orleans and State of Louisiana, have invented certain new and useful Improvements in Combined Cleaner and Heater for Steam-Boilers; and I do declare the following to be a full, clear, and exact description of the invention, such as will enable others skilled in the art to which it appertains to make and use the same.

My invention has for its object, primarily, the purification of the feed-water of boilers by the heating and filtration of the same within the boiler, whereby the silt, lime, and other impurities are removed therefrom, and whereby incrustation or scaling of the boiler is prevented, and this I do by placing within the steam-dome of the boiler a filtering-chamber, into which the feed-water is conducted by a pipe in the steam-dome, and by then delivering the filtered water into a sediment-pan located within the boiler, and from which pan the water escapes by overflow into the boiler. It is an improvement upon the construction shown in the prior patent granted to myself and G. G. Minor on September 22, 1885, No. 326,580.

The novelty of my invention will be herein set forth, and specifically pointed out in the claims.

The accompanying drawing is a side elevation of a boiler, partly in section, containing my improved heater and filter, also shown in section.

A represents a boiler, of the usual or any suitable construction, provided with a steam-dome, B. Entering the top of this dome is the feed-water pipe C, as shown, which passes down into the lower end of a vertical cylinder, D, which is divided into three compartments by means of perforated diaphragms a, between which are contained the filtering materials, consisting of charcoal, broken brick, or other suitable material. This, as shown, divides the cylinder or filtering-chamber into three compartments, into the lower open one of which the feed-water enters, and then passes up through the filtering material into the upper open compartment, whence it flows through a pipe, E, down and into an open sediment-pan, F, suitably supported within the steam-space near the top of the boiler.

G is a blow-off pipe extending from the lower open compartment of the chamber D, and is provided with a valve, b. H is a similar blow-off pipe entering the pan F. This pipe is likewise provided with a valve, c. From this construction it will be seen that the feed-water is heated in passing through the pipe C before it enters the lower compartment of the filtering-chamber. All impurities in solution are precipitated, and in suspension are arrested by the filtering material. When desired, pipe C may be passed through a coil placed in dome B. As an additional safeguard, should any impurities escape through the filtering material, they would pass with the water through the pipe E into and be caught by the pan F and there settle. The feed-water overflows from the pan F into the boiler almost if not quite at the boiling temperature.

To cleanse the filtering material and to remove the sediment collected in the lower compartment of the chamber D, it is only necessary to open the valve b, whereupon steam enters the pipe E, passes down through the filtering material, thereby cleansing the same of impurities, and blows out the collected sediment through the pipe G.

To remove the sediment from the pan F, it is only necessary to open the valve c, whereupon the pressure of steam forces the collected sediment out through the pipe H.

It is obvious that the sediment-pan F may be dispensed with, if desired, and the filtered water fed to the boiler directly from the upper part of the filtering-chamber D, though I find the water is more thoroughly purified by the use of the pan F. My device may be placed on the outside of an upright boiler and will render effective service. In this manner I provide a very simple and efficient feed-water heater and cleaner; and,

Having thus fully described my invention, I claim—

1. The combination, with a boiler provided with a steam-dome, of a feed-water pipe entering said dome, and its lower end entering the lower part of a filtering-chamber located mainly within said dome, a discharge-pipe opening from the upper part of said filtering-chamber, and a sediment-pan supported within the steam-space of the boiler, into which sediment-pan said discharge-pipe delivers the feed-water, substantially as described, whereby the water is heated and purified before entering the boiler.

2. The combination, with a boiler provided with a steam-dome, of a feed-water pipe entering said dome, and its lower end entering the lower part of a filtering-chamber located mainly within said dome, a discharge-pipe opening from the upper part of said filtering-chamber, a sediment-pan supported within the steam-space of the boiler, into which sediment-pan said discharge-pipe delivers the feed-water, and a blow-off pipe opening from the bottom of the filtering-chamber, substantially as and for the purpose described.

3. The combination, with a boiler provided with a steam-dome, of a feed-water pipe entering said dome, and its lower end entering the lower part of a filtering-chamber located within said dome, a discharge-pipe opening from the upper part of said filtering-chamber, a sediment-pan supported within the steam-space of the boiler, into which sediment-pan said discharge-pipe delivers the feed-water, and a blow-off pipe opening from the bottom of said sediment-pan, substantially as and for the purpose described.

4. The combination, with a boiler provided with a steam-dome, of a feed-water pipe entering said dome, and its lower end entering the lower part of a filtering-chamber located within said dome, a discharge-pipe opening from the upper part of said filtering-chamber, a sediment-pan supported within the steam-space of the boiler, into which sediment-pan said discharge-pipe delivers the feed-water, a blow-off pipe opening from the bottom of the filtering-chamber, and a blow-off pipe opening from the bottom of the sediment-pan, substantially as and for the purpose described.

5. The combination, with the boiler A, provided with the steam-dome B, of the feed-water pipe C, entering said dome, the vertical cylinder D, located mainly within the steam-dome and divided by means of perforated diaphragms $a$ into three compartments, the middle one of which is filled with suitable filtering material, and into the lower one of which the lower end of the feed-water pipe C enters and discharges the feed-water, the discharge-pipe E, opening from the upper compartment of the cylinder D, and the sediment-pan F, supported in the steam-space in the upper part of the boiler and receiving the filtered feed-water from the upper compartment of the cylinder D through the discharge-pipe E, from which sediment-pan the purified water overflows into the boiler A, substantially as and for the purpose specified.

6. The combination, with the boiler A, provided with the steam-dome B, of the feed-water pipe C, entering said dome, the vertical cylinder D, located mainly within the steam-dome and divided by means of perforated diaphragms $a$ into three compartments, the middle one of which is filled with suitable filtering material, and into the lower one of which the lower end of the feed-water pipe C enters and discharges the feed-water, the discharge-pipe E, opening from the upper compartment of the cylinder D, the sediment-pan F, supported in the steam-space in the upper part of the boiler and receiving the filtered feed-water from the upper compartment of the cylinder D through the discharge-pipe E, from which sediment-pan the purified water overflows into the boiler A, and the blow-off pipe G, opening from the lower compartment of the cylinder D, and provided with a valve, $b$, upon opening which the sediment in the lower compartment of the cylinder D is blown out through said blow-off pipe G, substantially as and for the purpose specified.

7. The combination, with the boiler A, provided with the steam-dome B, of the feed-water pipe C, entering said dome, the vertical cylinder D, located mainly within the steam-dome and divided by means of perforated diaphragms $a$ into three compartments, the middle one of which is filled with suitable filtering material, and into the lower one of which the lower end of the feed-water pipe C enters and discharges the feed-water, the discharge-pipe E, opening from the upper compartment of the cylinder D, the sediment-pan F, supported in the steam-space in the upper part of the boiler and receiving the filtered feed-water from the upper compartment of the cylinder D through the discharge-pipe E, from which sediment-pan the purified water overflows into the boiler A, and the blow-off pipe H, connected with the sediment-pan F, and having its inner end extending along the bottom of said pan, and provided with the valve $c$, upon opening which the sediment in the bottom of the pan F is blown out through said blow-off pipe H, substantially as and for the purpose specified.

8. The combination, with the boiler A, provided with the steam-dome B, of the feed-water pipe C, entering said dome, the vertical cylinder D, located mainly within the steam-dome and divided by means of perforated diaphragms $a$ into three compartments, the middle one of which is filled with suitable filtering material, and into the lower one of which the lower end of the feed-water pipe C enters and discharges the feed-water, the discharge-pipe E, opening from the upper compartment of the cylinder D, the sediment-pan F, supported in the steam-space in the upper part of the boiler and receiving the filtered feed-water from the upper compartment of the cylinder D through the discharge-pipe E, from which sediment-pan the purified water overflows into the boiler A, the blow-off pipe G, opening from the lower compartment of the cylinder D, and provided with a valve, $b$, upon opening which the sediment in the lower compartment of the cylinder D is blown out through said blow-off pipe G, and the blow-off pipe H, connected with the sediment-pan F, and provided with the valve c, upon opening which the sediment in the bottom of the pan F is blown out through said blow-off pipe H, substantially as and for the purpose specified.

9. The combination, with a boiler provided with a steam-dome, of a feed-water pipe entering said dome, and its lower end entering the lower part of a filtering-chamber located mainly within said dome, and the discharge-pipe E, substantially as and for the purpose specified.

10. The combination, with a boiler provided with a steam-dome, of a feed-water pipe entering said dome, and its lower end entering the lower part of a filtering-chamber located mainly within said dome, the discharge-pipe, and a blow-off pipe leading from the lower part of said filtering-chamber, substantially as and for the purpose specified.

11. The combination, with the boiler A, provided with the steam-dome B, of the feed-water pipe C, entering said dome, the filtering-chamber D, located mainly within the steam-dome, and divided by means of perforated diaphragms a into three compartments, the middle one of which is filled with suitable filtering material, and into the lower one of which the lower end of the feed-water pipe C enters and discharges the feed-water, and the discharge-pipe E, substantially as and for the purpose specified.

12. The combination, with the boiler A, provided with the steam-dome B, of the feed-water pipe C, entering said dome, the filtering-chamber D, located mainly within the steam-dome and divided by means of perforated diaphragms a into three compartments, the middle one of which is filled with suitable filtering material, and into the lower one of which the lower end of the feed-water pipe C enters and discharges the feed-water, and the blow-off pipe G, leading from the lower compartment of said filtering-chamber D, and provided with a valve, b, upon opening which the sediment in the lower compartment of the filtering-chamber D is blown out through said blow-off pipe G, and the discharge-pipe E, substantially as and for the purpose specified.

In testimony whereof I affix my signature in presence of two witnesses.

JOHN D. SULLIVAN.

Witnesses:
 HENRY J. RHODES,
 PERCY D. PARKS.